(12) United States Patent
Kim

(10) Patent No.: US 11,657,954 B2
(45) Date of Patent: May 23, 2023

(54) COIL MODULE AND POWER CONVERTER

(71) Applicant: DENSO CORPORATION, Kariya (JP)

(72) Inventor: Kwan Ryul Kim, Kariya (JP)

(73) Assignee: DENSO CORPORATION, Kariya (JP)

( * ) Notice: Subject to any disclaimer, the term of this patent is extended or adjusted under 35 U.S.C. 154(b) by 413 days.

(21) Appl. No.: 16/924,497

(22) Filed: Jul. 9, 2020

(65) Prior Publication Data

US 2021/0012953 A1     Jan. 14, 2021

(30) Foreign Application Priority Data

Jul. 9, 2019    (JP) .............................. JP2019-127624

(51) Int. Cl.
| | |
|---|---|
| *H02K 1/00* | (2006.01) |
| *H02K 1/04* | (2006.01) |
| *H02K 1/14* | (2006.01) |
| *H02K 3/00* | (2006.01) |
| *H02K 3/18* | (2006.01) |
| *H02K 3/32* | (2006.01) |
| *H01F 3/08* | (2006.01) |
| *H01F 5/04* | (2006.01) |
| *H01F 27/02* | (2006.01) |
| *H01F 27/04* | (2006.01) |
| *H01F 27/22* | (2006.01) |
| *H01F 27/24* | (2006.01) |
| *H01F 27/26* | (2006.01) |
| *H01F 27/28* | (2006.01) |
| *H01F 27/29* | (2006.01) |
| *H01F 27/30* | (2006.01) |
| *H02M 7/44* | (2006.01) |
| *H02M 7/00* | (2006.01) |

(52) U.S. Cl.
CPC ............... *H01F 27/29* (2013.01); *H01F 5/04* (2013.01); *H01F 27/022* (2013.01); *H02M 7/003* (2013.01)

(58) Field of Classification Search
CPC .. H02K 1/00; H02K 1/04; H02K 1/14; H02K 3/00; H02K 3/18; H02K 3/32; H01F 3/08; H01F 5/04; H01F 27/02; H01F 27/022; H01F 27/04; H01F 27/08; H01F 27/24; H01F 27/26; H01F 27/28; H01F 27/29; H01F 27/30; H02M 7/003
USPC ..... 361/775, 704; 363/13, 131; 336/13, 131, 336/90, 192, 205, 212, 221, 233; 310/43, 310/71, 72
See application file for complete search history.

(56) References Cited

U.S. PATENT DOCUMENTS

| | | | | |
|---|---|---|---|---|
| 4,773,518 | A | * | 9/1988 | Raad ..................... F16D 27/118 192/84.1 |
| 5,517,167 | A | * | 5/1996 | Yamamoto ........... H01H 50/443 335/132 |
| 7,523,542 | B2 | * | 4/2009 | Kawarai ............... H01F 17/045 336/83 |

(Continued)

FOREIGN PATENT DOCUMENTS

| | | |
|---|---|---|
| JP | 2001-285004 A | 10/2001 |
| JP | 2012-156349 A | 8/2012 |

*Primary Examiner* — Xiaoliang Chen
(74) *Attorney, Agent, or Firm* — Oliff PLC

(57) ABSTRACT

In a coil module, a coil device includes a coil unit and at least one terminal extending from the coil unit. A case is configured to house the coil device. At least one busbar is secured to the case. The at least one terminal is electrically connected to the at least one busbar. A potting member is filled in the case to fixedly retain the coil device in the case.

9 Claims, 9 Drawing Sheets

(56) References Cited

U.S. PATENT DOCUMENTS

| | | | |
|---|---|---|---|
| 7,973,634 B2* | 7/2011 | Aumueller | H01F 17/045 29/605 |
| 2011/0006870 A1* | 1/2011 | Sakamoto | H01F 17/045 336/221 |
| 2011/0156853 A1* | 6/2011 | Kato | H01F 27/327 336/221 |
| 2012/0044033 A1* | 2/2012 | Kawaguchi | H01F 27/022 336/90 |
| 2012/0056500 A1* | 3/2012 | Nakanishi | H02K 3/522 310/71 |
| 2012/0119869 A1* | 5/2012 | Yamamoto | H01F 27/255 336/212 |
| 2012/0175981 A1* | 7/2012 | Enami | H05K 7/209 310/72 |
| 2012/0319507 A1* | 12/2012 | Ueno | H02K 3/345 310/43 |
| 2013/0002383 A1* | 1/2013 | Esaki | H01F 27/255 29/606 |
| 2013/0008890 A1* | 1/2013 | Esaki | H01F 27/323 219/647 |
| 2013/0009495 A1* | 1/2013 | Ueno | H02K 15/12 310/43 |
| 2013/0099887 A1* | 4/2013 | Yamamoto | H01F 27/2804 336/220 |
| 2013/0114319 A1* | 5/2013 | Inaba | H01F 27/025 363/131 |
| 2013/0135072 A1* | 5/2013 | Inaba | H01F 3/08 336/90 |
| 2013/0181801 A1* | 7/2013 | Yoshikawa | H01F 27/263 336/180 |
| 2014/0232508 A1* | 8/2014 | Inaba | H01F 3/08 336/233 |
| 2014/0247623 A1* | 9/2014 | Inaba | H02M 3/158 336/61 |
| 2016/0020680 A1* | 1/2016 | Hattori | H02M 7/003 310/72 |
| 2018/0330866 A1* | 11/2018 | Takada | H01F 27/02 |
| 2018/0367031 A1* | 12/2018 | Ando | H02M 1/44 |
| 2021/0234413 A1* | 7/2021 | Won | H02K 3/522 |

* cited by examiner

COIL MODULE AND POWER CONVERTER

CROSS-REFERENCE TO RELATED APPLICATION

This application is based on and claims the benefit of priority from earlier Japanese Patent Application No. 2019-127624 filed on Jul. 9, 2019, the disclosure of which is incorporated herein by reference.

TECHNICAL FIELD

The present invention relates to coil modules and power converters each including such a coil module.

BACKGROUND

Power converters, such as inverters for vehicles, have installed therein a coil device serving as a noise filter for removing electrical noise.

SUMMARY

A coil module according to one aspect of the present disclosure includes at least one busbar secured to a case. An at least one terminal is electrically connected to the at least one busbar. The coil module includes a potting member filled in the case to fixedly retain the coil device in the case.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Viewpoint

Figure 1:
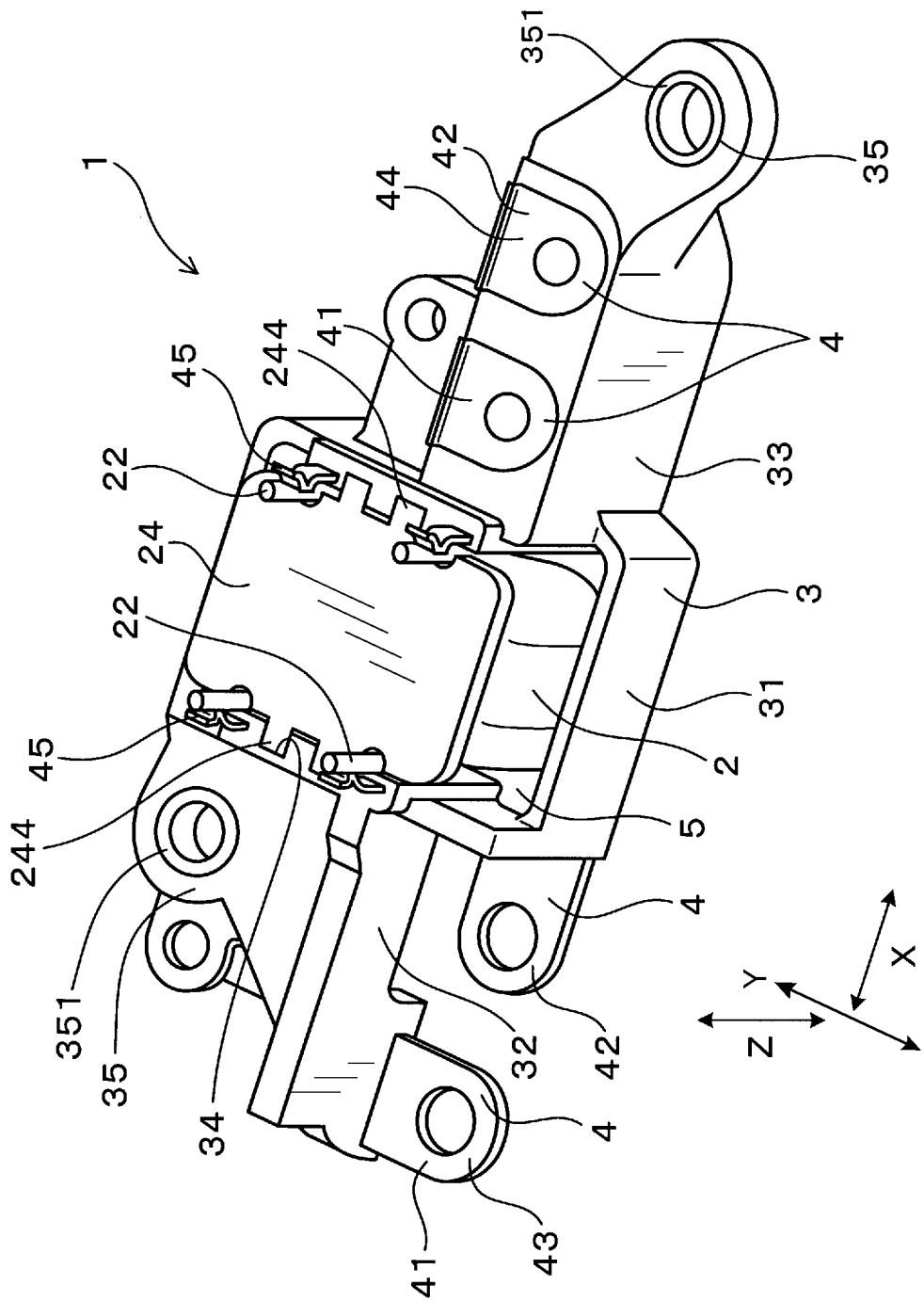
FIG. 1 is a perspective view of a coil module according to the first embodiment of the present disclosure.

Japanese Patent Application Publication No. 2012-156496 discloses such a power converter including a circuit board on which switching elements and a coil device having terminals are mounted. Specifically, the power converter described in the above patent publication is configured such that the terminals of the coil device are directly mounted on the circuit board, resulting in the coil device being directly mounted on the circuit board.

Recent strict electromagnetic compatibility (EMC) regulations or standards require a coil device to have a larger size. Power converters, each of which includes such a large-sized coil device directly mounted on a circuit board, may result in a smaller mount region in the circuit board. Power converters, each of which includes a coil device, therefore require the coil device to have a higher degree of flexibility in arrangement.

For addressing such a requirement, the present disclosure seeks to provide coil modules, each of which enables a coil device to have a higher degree of flexibility in arrangement, and also provide power converters each including at least one of the coil modules.

According to a first exemplary aspect of the present disclosure, there is provided a coil module. The coil module includes a coil device including a coil unit and at least one terminal extending from the coil unit, and a case configured to house the coil device. The coil module includes at least one busbar secured to the case, the at least one terminal being electrically connected to the at least one busbar, and a potting member filled in the case to fixedly retain the coil device in the case.

According to a second exemplary aspect of the present disclosure, there is provided a power converter. The power converter includes a coil module that is defined in the first exemplary aspect, and a circuit board to which at least one switch for power conversion is mounted. The coil device of the coil module is electrically connected to the circuit board via the at least one busbar.

The coil module according to the first exemplary aspect includes the coil device, the case configured to house the coil device, and the at least one busbar secured to the case. The at least one terminal extending from the coil unit of the coil device is electrically connected to the at least one busbar.

This configuration of the coil module enables the coil device to be electrically connected to a circuit board via the at least one busbar. This therefore enables the coil device to have a higher degree of flexibility in arrangement. That is, this configuration of the coil module improves a degree of arrangement flexibility of the coil device in an apparatus that uses the coil module.

In the power converter according to the second exemplary aspect, the coil device of the coil module is electrically connected to the circuit board via the at least one busbar. This therefore enables the coil device to have a higher degree of flexibility in arrangement. That is, this configuration of the power converter improves a degree of arrangement flexibility of the coil device in the power converter.

EMBODIMENTS

From the above viewpoint, the following describes coil modules, which are embodiments of the present disclosure, with reference to the accompanying drawings. In the embodiments, similar or equivalent parts between the embodiments, to which like reference characters are assigned, are omitted or simplified to avoid redundant description.

First Embodiment

The following describes a coil module 1 and a power converter including the coil module 1 with reference to FIGS. 1 to 10.

Referring to FIGS. 1 to 4, the coil module includes a coil device 2, a coil case 3, busbars 4, and a potting member, 5.

The coil device 2 is comprised of a coil assembly 21 serving as a coil unit, and the coil case 3 is configured to house the coil device 2. The busbars 4 are secured to the coil case 3. The potting member 5 is filled in the coil case 3 to fixedly retain the coil device 2 in the coil case 3 and protect the coil device 2 from various environments. The coil device 2 is comprised of terminals, referred to as coil terminals, 22 extending from the coil assembly 21. The coil terminals 22 are electrically connected to the busbars 4.

Referring to FIGS. 1 to 4, the coil case 3, which is made of an electrically insulating material, such as a resin, is comprised of a container member 31 having, for example, a substantially rectangular-parallelepiped shape. The container member 31 has an inner space thereinside, and has a base wall 310 and a top wall 311 located at an opposite side of the base wall 310. The top wall 311 has a peripheral edge 311a and an opening 311b defined inside the peripheral edge 311a; the top wall 311 therefore serves as an opening wall 311.

The coil device 2 is housed in the inner hollow space of the container member 31 such that a normal direction to the opening wall 311 of the container member 31 is substantially parallel to the extending direction of the coil terminals 22 of the coil device 2.

The normal direction to the opening wall 311 of the container member 31, which is perpendicular to the base wall 310, is defined as a Z direction in the specification. In other words, the Z direction is defined as a reference axis between the base wall 310 and the opening wall 311.

The Z direction has a first directional side corresponding to the extending side of the terminals 22, which will be conveniently referred to as an upper side, and also has a second directional side opposite to the first directional side; the second directional side will be conveniently referred to as a lower side. The upper and lower sides of the Z direction are merely conveniently used, and therefore the upper and lower sides of the Z direction are not limited to the arrangement and attitude of the coil module 1.

Figure 5:
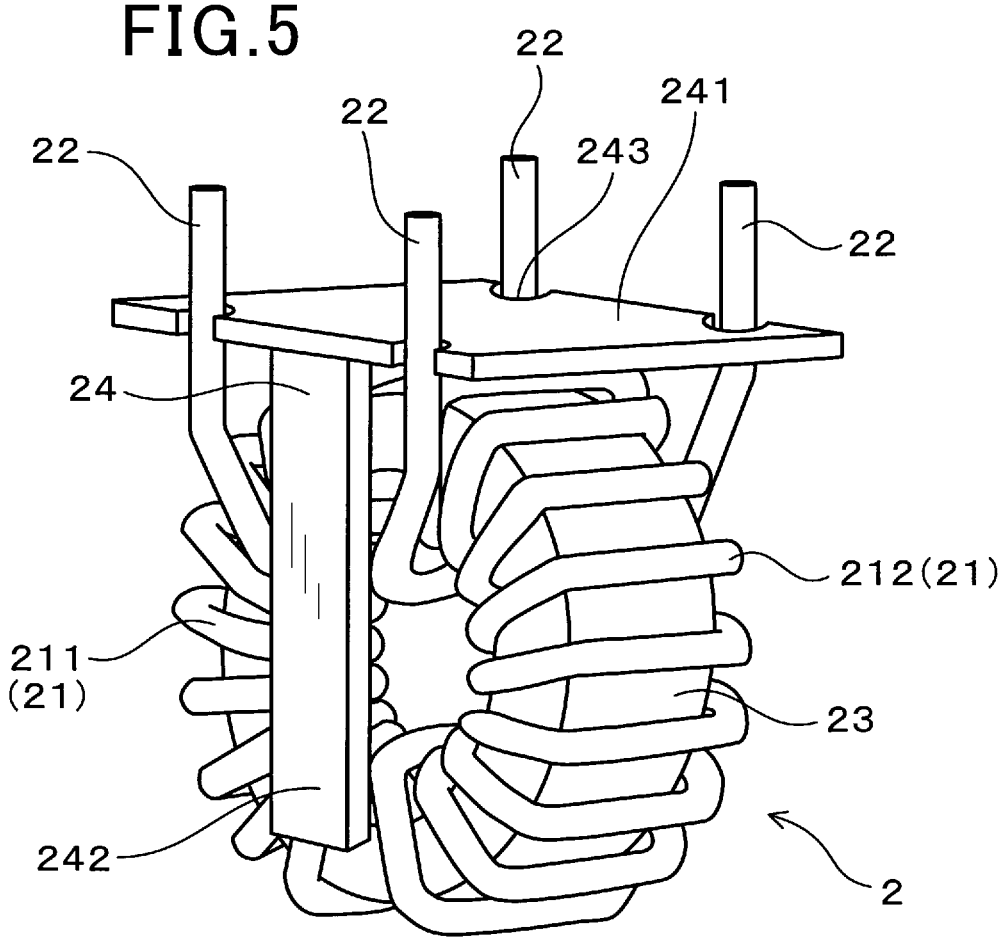
FIG. 5 is an enlarged perspective view of a coil assembly according to the first embodiment.

The coil device 2, as illustrated in FIG. 5, is comprised of a toroidal core 23 that generates a magnetic path therein. The coil device 2 is further comprised of first and second windings 211 and 212, each of which is a conductive wire, wound around the toroidal core 23 while the first and second windings 211 and 212 are electrically isolated from each other. The first and second windings 211 and 212 wound around the toroidal core 23 constitute the coil assembly 21.

Specifically, the first winding 211 is wound through the inside and outside of, for example, a first half part of the toroidal core 23 predetermined times, and similarly the second winding 212 is wound through the inside and outside of, for example, a second half part of the toroidal core 23 predetermined times. The first winding 211 wound around the first half part of the toroidal coil 23 and the second winding 212 wound around the second half part of the toroidal core 23 are magnetically coupled to each other via the core 23. That is, the coil device 2 is designed as a toroidal coil device.

Each of the first and second windings 211 and 212 has opposing first and second ends in its length direction; the first and second ends of the first and second windings 211 and 212, i.e. the four ends of the first and second windings 211 and 212, serve as the respective coil terminals 22. The four coil terminals 22 extend for example parallelly toward the first directional side of the Z direction while the coil device 2 is installed in the container member 31.

The coil device 2 is additionally comprised of a bobbin 24 made of, for example, a resin. The bobbin 24 is configured to retain the coil assembly 21 and the core 23.

While the coil device 2 is installed in the container member 31, the toroidal core 23 has opposing first and second ends; the first end is located to be closer to the opening wall 311 than to the base wall 310, and the second end is located to be closer to the base wall 310 than to the opening wall 311.

The bobbin 24 is comprised of, for example, a lid member 241 having, for example, a substantially rectangular plate-like shape, that is designed to be in conformity with the shape of the opening wall 311 of the container member 31. The lid member 241 is disposed adjacently to the first end of the toroidal core 23. The bobbin 24 is also comprised of at least two leg members 242, each of which extends from the lid member 241 toward the second directional side of the Z direction. In other words, each of the leg members 242 extends from the lid member 241 in a direction opposite to the extending direction of the coil terminals 22. The toroidal core 23 has opposing annular surfaces in its axial direction perpendicular to the Z direction. The leg member 242 are respectively located on both sides of the toroidal core 23 to face the respective annular surfaces of the toroidal core 23.

The coil device 2 includes an unillustrated core cover that covers the toroidal core 23. The core cover is for example secured to the lid member 241. That is, the first and second windings 211 and 212 are wound around the toroidal core 23 through the core cover.

The container member 31 includes a first pair of longitudinal sidewalls 310a and 310b, and a second pair of lateral sidewalls 310c and 310d. These sidewalls 310a to 310d and the base wall 310 define the inner hollow space therein. The longitudinal direction of the longitudinal sidewalls 310a and 310b perpendicular to the Z direction is also defined as a Y direction.

The lid member 241 has opposing first and second major sides, and is arranged such that the second major side of the lid member 241 faces the first end of the toroidal core 23, and the first major side of the lid member 241 turns toward the first directional side of the Z direction.

Figure 2:
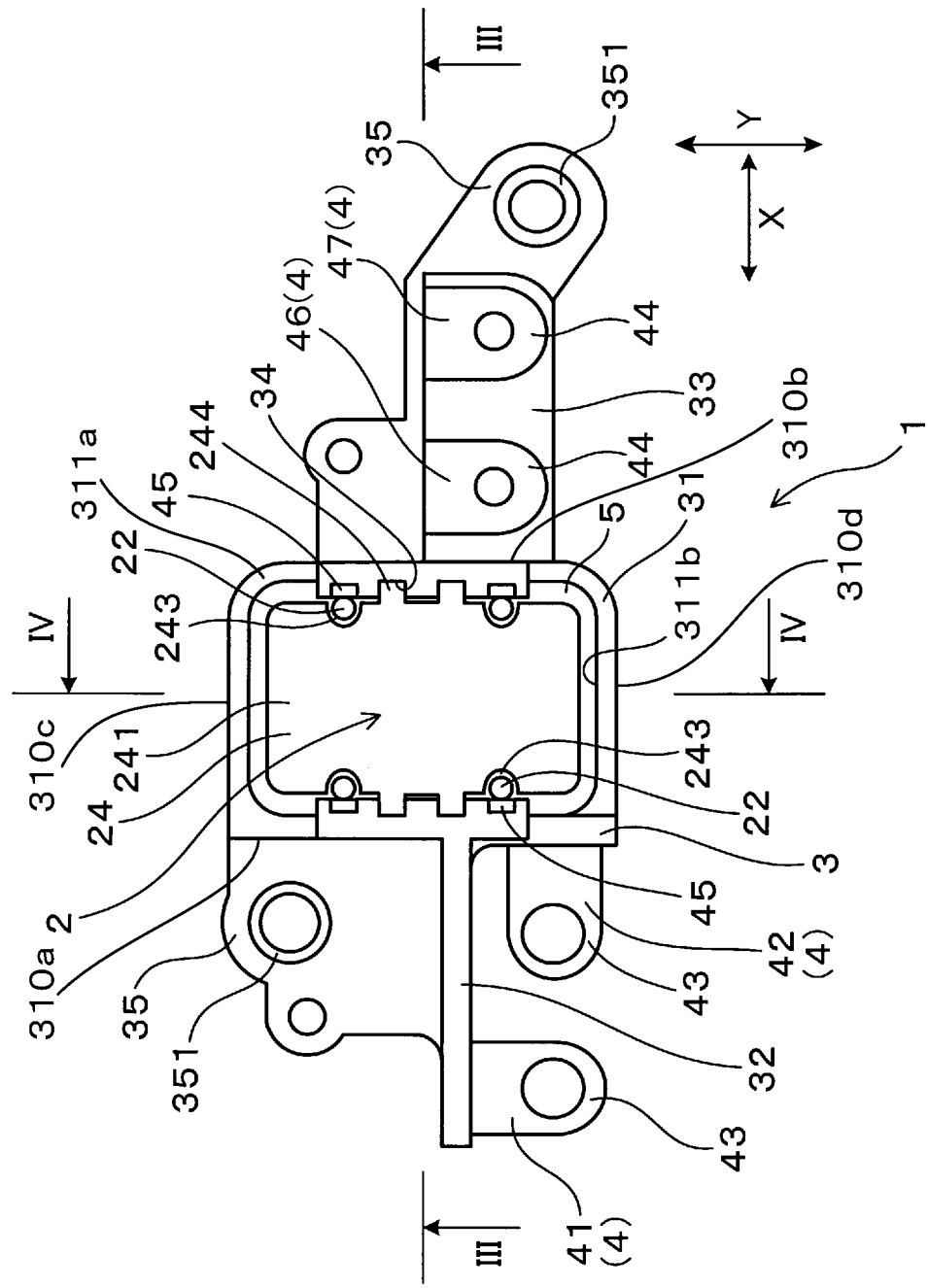
FIG. 2 is a plan view of the coil module illustrated in FIG. 1.

As illustrated in FIGS. 1, 2, and 5, the lid member 241 has a first pair of opposing longitudinal edges corresponding to the opposing longitudinal sidewalls 310a and 310b, and a second pair of opposing lateral edges corresponding to the opposing lateral sidewalls 310c and 310d. The lid member 241 includes notches 243 formed in the respective longitudinal edges; the notches 243 are located to be aligned with the respective coil terminals 22 in the Z direction. That is, the coil terminals 22 are arranged to extend from the coil assembly 21 toward the first directional side of the Z direction while passing through the respective notches 243. Each of the longitudinal edge of the lid member 241 extends in the Y direction perpendicular to the Z direction.

Additionally, the lid member 241 includes engagement members 244 projecting outwardly from, for example, the opposing longitudinal edges thereof. While the coil device 2 is installed in the container member 31, the coil terminals 22 are located through the respective notches 243, and the engagement members 244 of the lid member 241 are respectively engaged with corresponding portions 34 of the peripheral edge 311a of the top wall 311 of the container member 31. This enables positioning of the coil terminals 22 and the coil assembly 2 with respect to the coil case 3 to be completed.

The busbars 4 include a first busbar serving as a positive busbar, 41 a second busbar serving as a negative busbar, 42, a third busbar serving as a positive busbar 46, and a fourth busbar serving as a negative busbar 47.

Each of the first to fourth busbars 4 (41, 42, 46, and 47) is secured to the insulative coil case 3. For example, each of the first to fourth busbars 4 (41, 42, 46, and 47) is embedded in the coil case 3 while predetermined portions of the corresponding one the first to fourth busbars 4 (41, 42, 46, and 47) are exposed from the coil case 3. For example, using insert molding enables the resin coil case 3 in which a predetermined part of each of the first to fourth busbars 4 (41, 42, 46, and 47) is placed to be created.

Each of the first and second busbars 41 and 42, as illustrated in FIGS. 1 to 3 and 7, includes an input terminal 43 and a connection terminal 45 that are exposed from the coil case 3. Similarly, each of the third and fourth busbars 46 and 47, as illustrated in FIGS. 1 to 3 and 7, includes a connection terminal 45 and an output terminal 44 that are exposed from the coil case 3.

The connection terminals 45 of the respective first and second busbars 41 and 42 are arranged to extend from the coil case 3 to be joined to the coil terminals (first ends) 22 of the respective first and second windings 211 and 212, and the connection terminals 45 of the respective third and fourth busbars 46 and 47 are arranged to extend from the coil case 3 to be joined to the coil terminals (second ends) of the respective first and second windings 211 and 212.

For example, the connection terminals 45 of the respective first and second busbars 41 and 42 are welded to the coil terminals (first ends) 22 of the respective first and second windings 211 and 212, and the connection terminals 45 of the respective third and fourth busbars 46 and 47 are welded to the coil terminals (second ends) of the respective first and second windings 211 and 212.

The input terminal 43 of each of the first and second busbars 41 and 42 is connected to a direct-current power source, i.e. a battery, BAT, which will be described later (see FIG. 7), and the output terminal 44 of each of the third and fourth busbars 46 and 47 is connected to a circuit board 12, which will be described later (see FIG. 7).

The potting member 5 is disposed in the container member 31 together with the coil device 2. For example, the potting member 5 is made of, for example, an epoxy resin. The potting member 5 is filled in a lower portion of the inner hollow space of the container member 31, so that a lower part of the coil device 2 is embedded in the potting member 5; the lower part of the coil device 2, i.e. the coil assembly 21, will also be referred to as an embedded portion hereinafter.

That is, the potting member 5 enables the coil device 2 to be adhered to the container member 31, thus being secured thereto. The potting member 5 disposed in the lower portion of the inner hollow space of the container member 31 has a top surface 51 in the Z direction; the top surface 51 serves as, for example, a potting surface.

Figure 3:
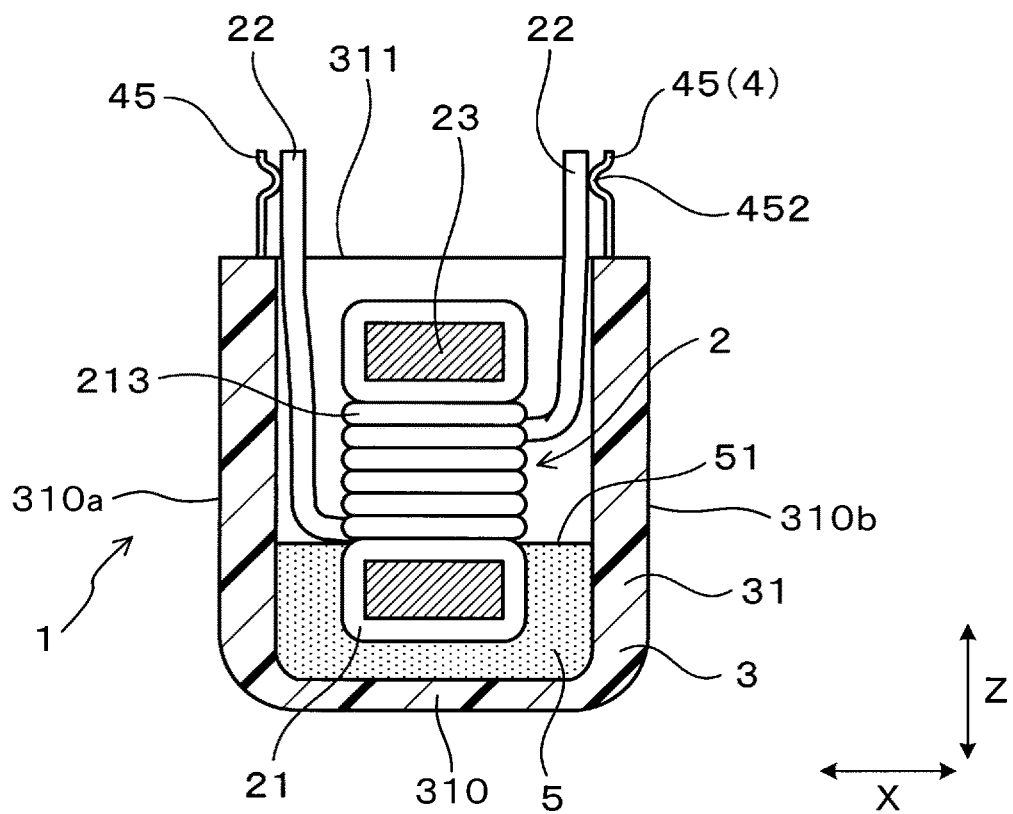
FIG. 3 is a cross-sectional view of a coil case illustrated in FIG. 2, which is taken along line III-III of FIG. 2 as viewed in the direction of arrows III-III.
Figure 4:
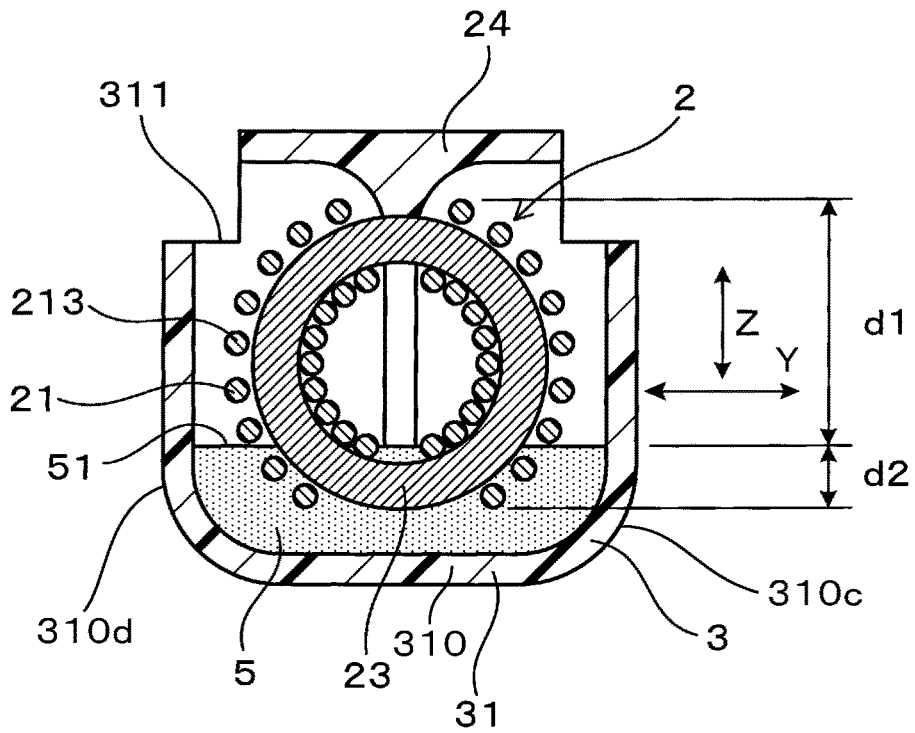
FIG. 4 is a cross-sectional view of the coil case, which is taken along line IV-IV of FIG. 2 as viewed in the direction of arrows IV-IV.

The coil assembly 21, as illustrated in FIGS. 3 and 4, includes an exposed portion 213 exposed from the potting member 5. That is, the coil assembly 21 includes the embedded portion embedded in the potting member 5, and the exposed portion 213 exposed from the potting member 5. The potting member 5 enables the lower portion of the coil assembly 21 to be embedded therein while the other portion of the coil assembly 21 to be exposed therefrom as the exposed portion 213.

The exposed portion 213 of the coil assembly 21 has a predetermined length in a normal direction to the top surface 51 of the retain member 5, which is parallel to the Z direction; the length of the exposed portion 213 is set to be equal to or more than half the length of the coil assembly 21 in the Z direction, i.e. in its axial direction. Specifically, as illustrated in FIG. 4, the exposed portion 213 of the coil assembly 21 in the Z direction has a length of d1, and the embedded portion of the coil assembly 21 in the Z direction has a length of d2; the length d1 is set to be equal to or larger than the length d2. In particular, the exposed portion 213 of the coil assembly 21 is exposed from the potting member 5 such that the axial length d1 of the exposed part 213 is larger than the axial length d2 of the embedded portion.

The coil case 3 is made of a resin, such as a PBT (polybutylene terephthalate) resin. Each of the coil case 3 and the potting member 5 has a given linear expansion coefficient, and the linear expansion coefficient of the coil case 3 can be preferably set to be close to the linear expansion coefficient of the potting member 5 in view of reduction in cold-energy stress between the coil case 3 and potting member 5. For example, adjusting the amount of a filler filling into at least one of the resin of the coil case 3 and the resin of the potting member 5 enables the linear expansion coefficient of the coil case 3 to be substantially equal to the linear expansion coefficient of the potting member 5.

Referring to FIGS. 1 and 2, the coil case 3 is also comprised of a first busbar holder 32 and a second busbar holder 33 that are integrally formed with the container member 31 as a single member. The first busbar holder 32 is configured to continuously extend from the longitudinal sidewall 310a of the container member 31 away therefrom in a direction perpendicular to the Z direction and the Y direction; this direction in which the first busbar holder 32 extends is defined as an X direction. Similarly, the second busbar holder 33 is configured to continuously extend from the longitudinal sidewall 310b of the container member 31 away therefrom in the X direction perpendicular to the Z direction and the Y direction.

The X direction has a first directional side corresponding to the extending direction of the first busbar holder 32 away from the container member 31, and a second directional side corresponding to the extending direction of the second busbar holder 33 away from the container member 31.

In other words, the first and second busbar holders 32 and 33 are located on both sides of the container member 31 in the X direction, and therefore the first busbar holder 32, the container member 31, and the second busbar holder 33 are aligned in the X direction.

The first busbar 41 has opposing first and second ends in its length direction. The first busbar 41 extends from the container member 31 through the first busbar holder 32, and the first end of the first busbar 41 in the first directional side of the X direction is exposed from an extending end of the first busbar holder 32 in the first directional side of the X direction. The exposed first end of the first busbar 41 is shaped as the input terminal 43 of the first busbar 41.

Similarly, the second busbar 42 has opposing first and second ends in its length direction. The second busbar 42 extends from the container member 31 through the first busbar holder 31, and the first end of the second busbar 42 in the first directional side of the X direction is exposed from the extending end of the first busbar holder 32 in the first directional side of the X direction. The exposed first end of the second busbar 42 is shaped as the input terminal 43 of the second busbar 42.

The third busbar 46 has opposing first and second ends in its length direction. The third busbar 46 extends from the container member 31 through the second busbar holder 33, and the first end of the third busbar 46 in the second directional side of the X direction is exposed from an extending end of the second busbar holder 33 in the second directional side of the X direction. The exposed first end of the third busbar 46 is shaped as the output terminal 44 of the third busbar 46.

Similarly, the fourth busbar 47 has opposing first and second ends in its length direction. The fourth busbar 47 extends from the container member 31 through the second busbar holder 33, and the first end of the fourth busbar 47 in the second directional side of the X direction is exposed from the extending end of the second busbar holder 33 in the second directional side of the X direction. The exposed first end of the fourth busbar 47 is shaped as the output terminal 44 of the fourth busbar 47.

Figure 6:
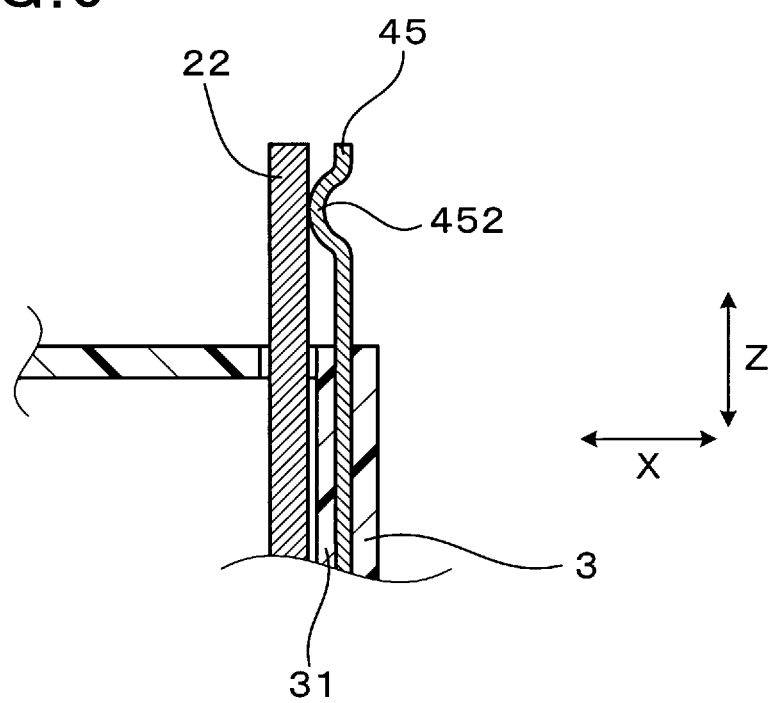
FIG. 6 is an enlarged cross-sectional view of a joint portion between a connection terminal and a coil terminal.

Referring to FIGS. 1, 3, and 6, each of the busbars 41, 42, 46, and 47 is arranged to extend in the coil case 3 toward the first directional side of the Z direction, so that the second end of each of the busbars 41, 42, 46, and 47, which serves as the connection terminal 45, projects from the peripheral edge 311a of the top wall 311 of the container member 31 of the coil case 3. In particular, the projecting connection terminal 45 of each of the busbars 41, 42, 46, and 47 is arranged to adjacently face, i.e. overlay, the corresponding one of the coil terminals 22 in the X direction. A predetermined portion of the projecting connection terminal 45 of each of the busbars 41, 42, 46, and 47 is welded to a corresponding portion of the corresponding one of the coil terminals 22 in the X direction; the corresponding portion of each of the coil terminals 22 faces the predetermined portion of the projecting connection terminal 45 of the corresponding one of the coil terminals 22 in the X direction.

For example, as illustrated in FIG. 6, the projecting connection terminal 45 of each of the busbars 41, 42, 46, and 47 has a convexly curved portion 452 convexly curved toward the corresponding one of the coil terminals 22 so as to be welded to the corresponding portion of the corresponding one of the coil terminals 22 in the X direction; the corresponding portion of each of the coil terminals 22 faces the convexly curved portion 452 of the projecting connection terminal 45 of the corresponding one of the coil terminals 22. For example, bending a part of the connection terminal 45 exposed from the coil case 3 enables the convexly curved portion 451 to be easily formed.

The convexly curved portion 452 has, for example, a semicircular convex shape toward the corresponding coil terminal 22, but can have a desired shape preferably easily and/or reliably connectable to the corresponding coil terminal 22.

Additionally, the coil case 3, as illustrated in FIGS. 1, 2, 8, and 10, is comprised of attachment portions 35, each of which has a shape enabled to be fixedly attached or mounted to a case 13 of a power converter 10 described later. The attachment portions 35 are located across the container member 31 in the X direction. That is, one of the attachment portions 35 is located on an opposite side of the container member 31 from the other of the attachment portions 35 in the X direction. Each of the attachment portions 35 includes a collar 351 disposed to be parallel to the Z direction. For example, insert molding enables the collar 351 to be formed in each attachment portion 35. The collar 351 of each attachment portion 35 has a hole formed therethrough in the Z direction.

The coil module 1, as illustrated in FIGS. 7 to 10, serves as a component of the power converter 10. The power converter 10 includes the coil module 1, a power converter circuit 120 including switches SW, and the circuit board 12 to which the coil module 1 is connected and the power converter circuit 120 is mounted. The coil module 1 is electrically connected to the circuit board 12 via the third and fourth busbars 46 and 47.

Figure 7:
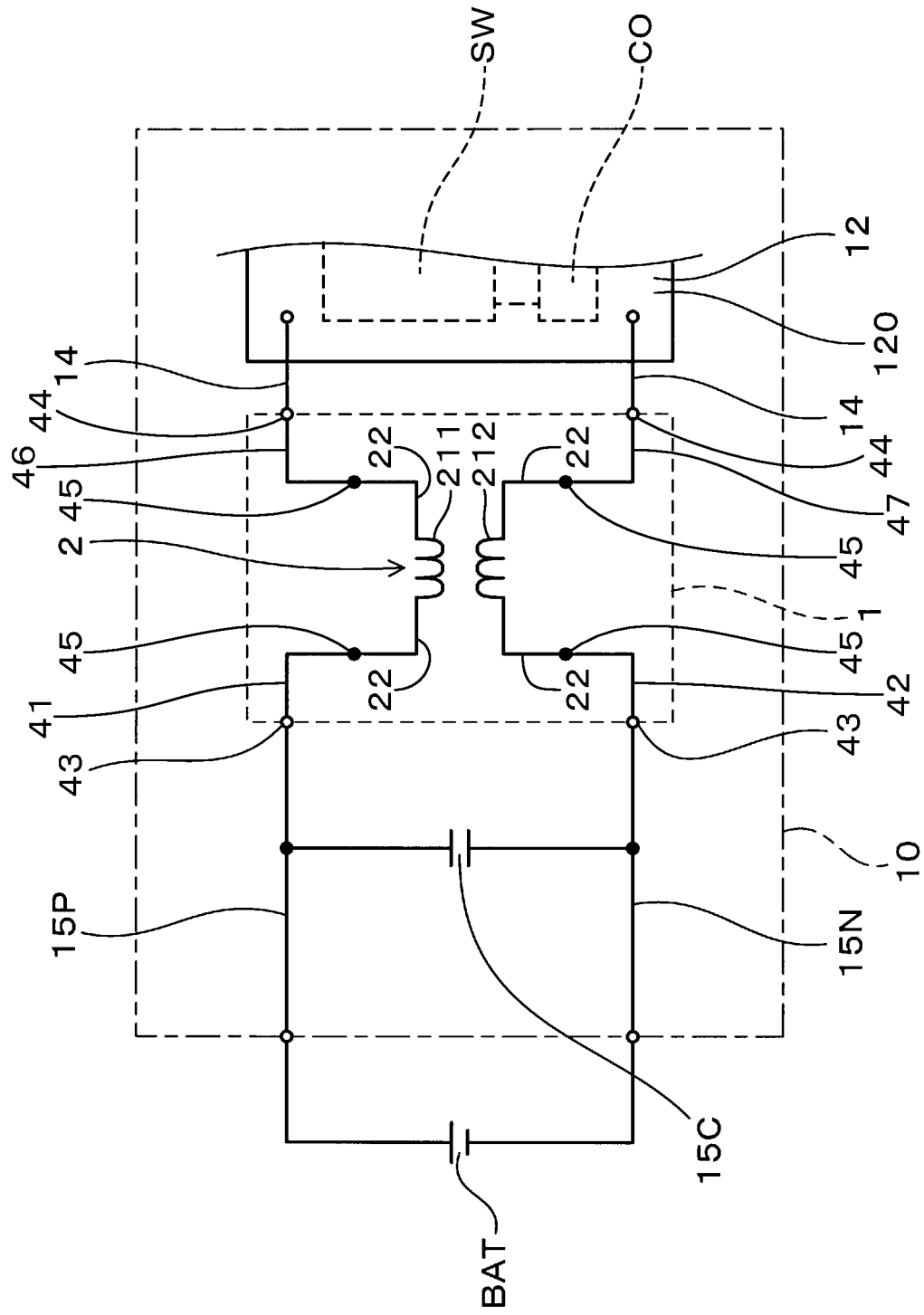
FIG. 7 is a circuit diagram schematically illustrating a power converter according to the first embodiment.

In particular, referring to FIG. 7, the coil module 1 is connected between the DC power source BAT, which has positive and negative electrodes, and the circuit board 12 via wiring members 14, 15P, and 15N. The wiring members 14, 15P, and 15N include a positive input wiring member 15P, a negative input wiring member 15N, and external connection wiring members 14.

Specifically, the input terminal 43 of the first busbar 41 of the coil module 1 is connected to the positive electrode of the DC power source BAT via the positive input wiring member 15P, and the input terminal 44 of the second busbar 42 of the coil module 1 is connected to the negative electrode of the DC power source BAT via the negative input wiring member 15N.

The power converter 10 also includes a filter capacitor 15C connected between the input wiring members 15P and 15N in parallel to the DC power source BAT. The filter capacitor 15C and the coil device 2 of the coil module 1 serve as a filter circuit, which aims to reduce noise contained in input DC power supplied from the DC power source BAT.

The power converter circuit 120 includes a controller CO, and the controller CO is configured to perform on-off switching operations of each of the switches SW to thereby convert the input DC power supplied from the DC power source BAT into output power. For example, the controller CO can perform on-off switching operations of each of the switches SW of the power converter 10 to thereby cause the power converter 10 to serve as a DC-DC power converter that converts an input voltage of the input DC power into an output voltage of the output DC power; the output voltage being different from the input voltage.

As another example, the controller CO performs on-off switching operations of each of the switches SW to thereby convert the input DC power into alternating-current (AC) power.

As the external connection wiring members 14, busbar-shaped connection wiring members or wire-shaped wiring members can be used.

Figure 8:
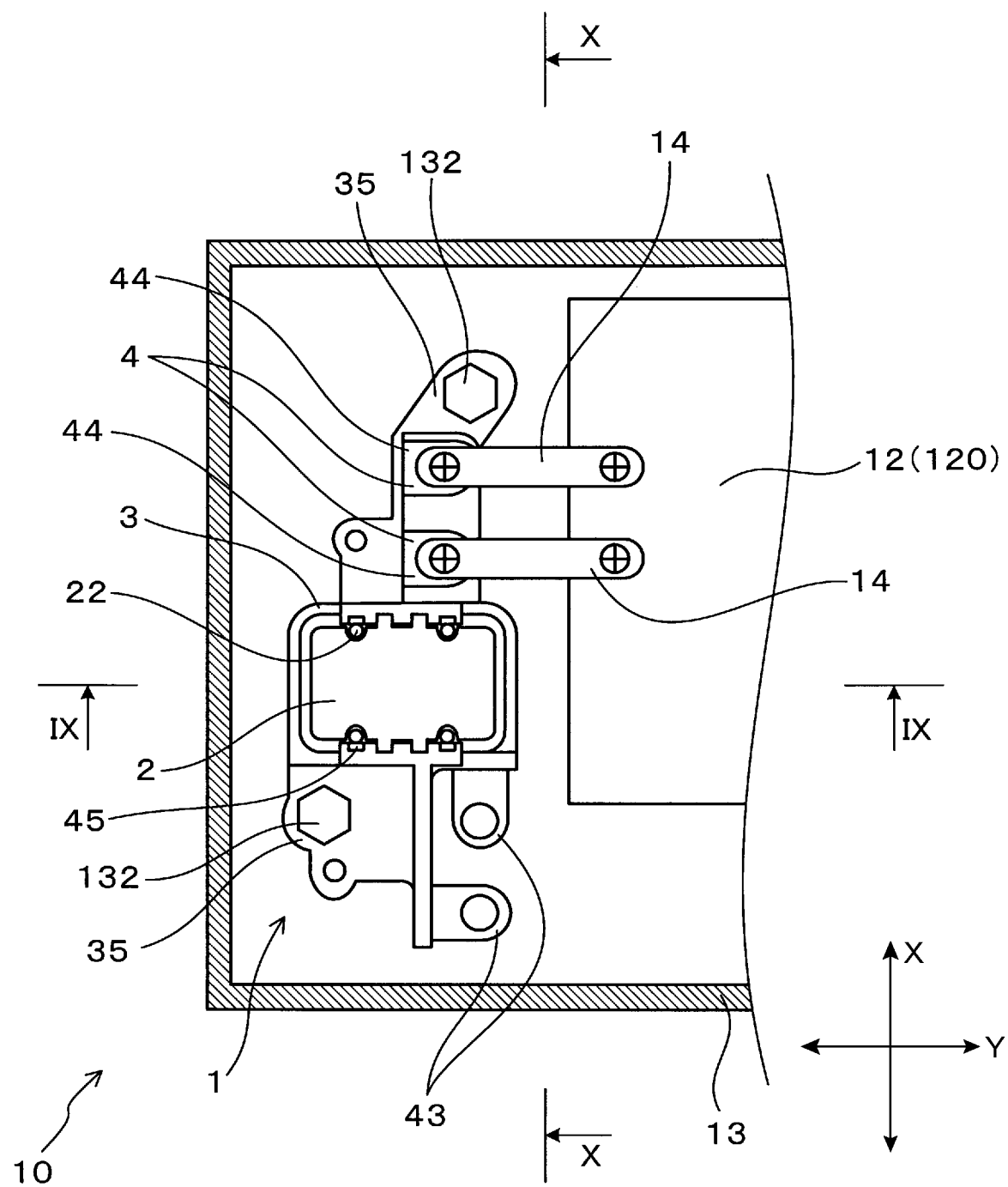
FIG. 8 is a partially cross-sectional plan view of a part of the power converter.

The coil device 2 is arranged not to overlay the circuit board 12 in a normal direction to a major surface of the circuit board 12 (see, for example, FIG. 8). In particular, the coil module 1 according to the first embodiment is arranged without overlaying the circuit board 12 when viewed in the normal direction corresponding to the Z direction (see, for example, FIG. 8). The coil module 1 can be arranged such that a part of the coil module 1, such as a part of the coil case 3, overlays the circuit board 12 in the Y direction.

Figure 9:
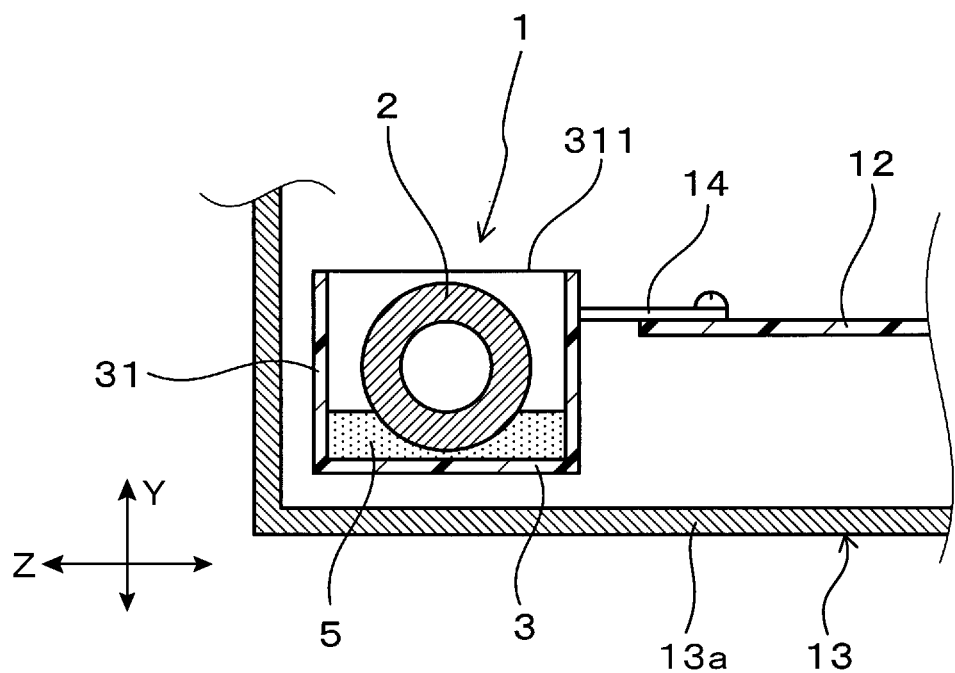
FIG. 9 is a cross-sectional view taken along line IX-IX of FIG. 8 as viewed from the direction of arrows IX-IX.

Additionally, as illustrated in, for example, FIG. 9, the coil device 2 is arranged to face the circuit board 12 in the Y direction, so that a virtual line extending from the circuit board 12 in the Y direction passes through the coil device 2 when viewed from the X direction. In other words, the coil device 2 is located across the virtual line extending from the circuit board 12 in the Y direction when viewed from the X direction.

Figure 10:
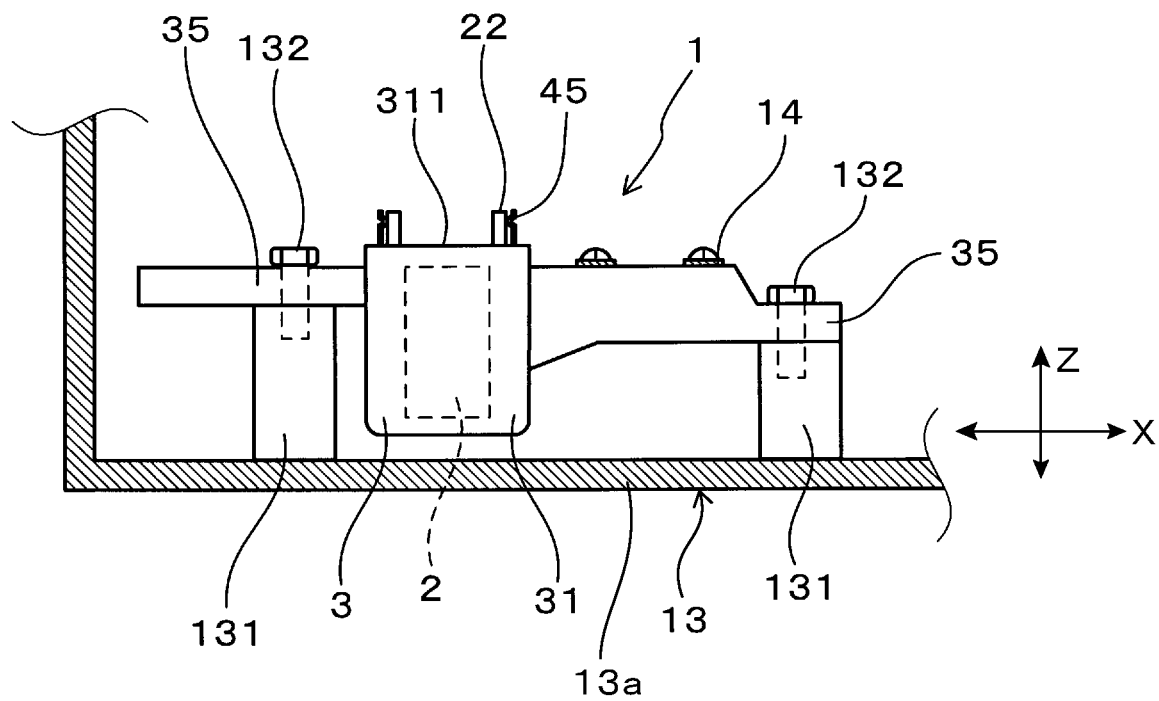
FIG. 10 is a cross-sectional view taken along line X-X of FIG. 8 as viewed from the direction of arrows X-X.

The power converter 10, as illustrated in FIGS. 8 to 10, is comprised of a converter case 13 having a rectangular-parallelepiped hollow chamber defined therein. The power converter 10 is also comprised of the coil module 1 and the circuit board 12 installed in the converter case 13.

As described above, the coil case 3 includes the attachment portions 35, and the coil module 1 is fastened to the converter case 13 through the attachment portions 35 with, for example, bolts 132.

For example, the converter case 13 has a bottom wall 13a in the Z direction, and annular bosses 131, each of which has an axially female threaded portion therein, are provided on the bottom wall 13a to project therefrom toward the first directional side of the Z direction. The arrangement of the annular bosses 131 conforms with the arrangement of the collars 351 of the attachment portions 35. That is, the attachment portions 35 of the coil module 1 are respectively mounted on the annular bosses 131 while the collars 351 are aligned with the female-threaded portions of the respective annular bosses 131, bolts 132 threadably fitted in the respective female-threaded portions of the respective annular bosses 131 via the collars 351 enable the coil module 1 to be fastened to the converter case 13.

The circuit board 12 is also fastened to the converter case 13 with, for example, bolts, the illustration of which is omitted. Note that the normal direction to a major surface of the circuit board 12 is identical to the normal direction to the opening wall 311 of the container member 31, that is, to the Z direction.

Next, the following describes how the coil module 1 works, and also describes benefits achieved by the configuration and working of the coil module 1.

The coil module 1 according to the first embodiment includes the coil device 2, the coil case 3 configured to house the coil device 2, and the busbars 4 secured to the coil case 3. The coil terminals 22 extending from the coil device 2 are electrically connected to the respective busbars 4.

This configuration of the coil module 1 enables the coil device 2 to be electrically connected to the circuit board 12 via at least one of the busbars 4. This therefore enables the coil device 2 to have a higher degree of flexibility in arrangement. That is, this configuration of the coil module 1 improves a degree of arrangement flexibility in the coil device 2 in the power converter 10.

The coil assembly 21 includes the embedded portion embedded in the potting member 5, and the exposed portion 213 exposed from the potting member 5. In other words, at least part of the coil assembly 21 is arranged to be exposed from the potting member 5. This results in the number of adjacent winding portions in the coil assembly 21 between which a part of the potting member 5 is interposed being smaller, making it possible to prohibit a capacitor component from being generated between the adjacent winding portions in the coil assembly 21.

If the whole of the coil assembly 21 were embedded in the potting member 5, the capacitance of capacitor components generated between the adjacent winding portions in the coil assembly 21 would become higher, possibly deteriorating a high-frequency removal capability of the coil device 2. From this viewpoint, the coil assembly 21, which is comprised of the exposed portion 213 exposed from the potting member 5, results in an improvement of a filtering performance of the coil device 2, making it possible to easily reduce the size of the coil device 2.

The exposed portion 213 of the coil assembly 21 has the predetermined length in the normal direction to the top surface 51 of the retain member 5, which is parallel to the Z direction; the length of the exposed portion 213 is set to be equal to or more than half the length of the coil assembly 21 in the normal direction, i.e., the Z direction. In other words, the length of the exposed portion 213 is set to be greater than or equal to 0.5 times the length of the coil assembly 21 in the normal direction, i.e., the Z direction.

That is, as illustrated in FIG. 4, the length d1 of the exposed portion 213 of the coil assembly 21 in the Z direction and the length d2 of the embedded portion of the coil assembly 21 in the Z direction have the relation d1≥d2 therebetween. This results in the size of the exposed portion 231 of the coil assembly 21 becoming larger, making it possible for the coil device 2 to have a higher filtering performance.

The coil device 2 is arranged not to overlay the circuit board 12 in the Z direction, which corresponds to the normal direction to a major surface of the circuit board 12 (see FIG. 8). This arrangement eliminates the need of ensuring a large space in the normal direction of a major surface of the circuit board 12, i.e. in the thickness direction of the circuit board 12, making it possible to maintain the size of the power converter 10 as small as possible in the thickness direction of the circuit board 12 upon a large-sized coil device 2 being installed in the coil module 1.

Additionally, the coil case 3 includes the attachment portions 35. This enables the coil module 1 to be fastened to the converter case 13 through the attachment portions 35. This results in reduction in vibrations of at least the coil module 1.

As described above, the first embodiment provides the coil module 1 having a higher degree of arrangement flexibility of the coil device 2, and also provides the power converter 10 including the coil module 1.

Second Embodiment

Figure 11:
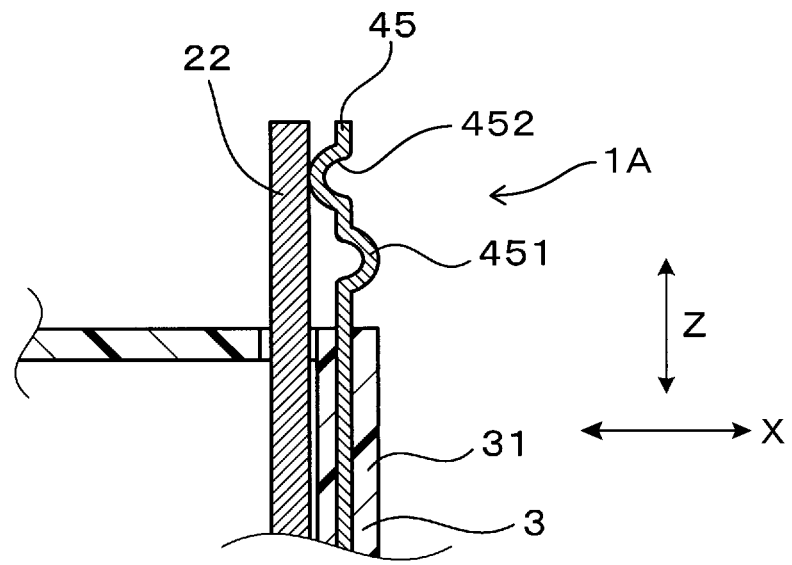
FIG. 11 is an enlarged cross-sectional view of a joint portion between a connection terminal and a coil terminal according to the second embodiment of the present disclosure.
Figure 12:
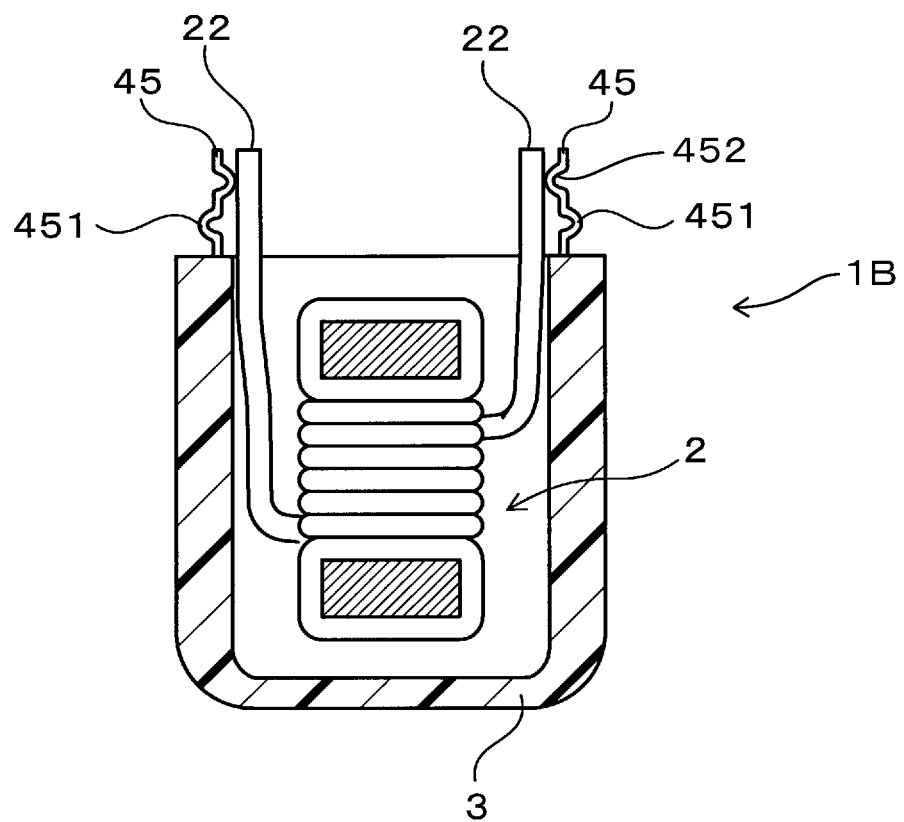
FIG. 12 is a cross-sectional view of a coil module according to a modification of the second embodiment, which corresponds to FIG. 3 of the first embodiment.

The following describes the second embodiment of the present disclosure with reference to FIGS. 11 and 12. The configuration and functions of a coil module 1A according to the second embodiment are mainly different from those of the coil module 1 according to the first embodiment by the following points. The following therefore mainly describes the different points.

As illustrated in FIG. 11, the projecting connection terminal 45 of each of the busbars 41, 42, 46, and 47, which is exposed from the coil case 3, has a stress-relaxation portion 451 located, for example, adjacent to the convexly curved portion 452. The stress-relaxation portion 451 is configured to be convexly curved toward the second directional side of the X direction, which is opposite to the convex direction of the convexly curved portion 452, i.e. to the first directional side of the X direction. For example, bending a part of the connection terminal 45 exposed from the coil case 3 enables the stress-relaxation portion 451 to be easily formed.

The stress-relaxation portion 451 is located to be lower than the connection portion of the connection terminal 45 to the corresponding coil terminal 22 in the Z direction. That is, the stress-relaxation portion 451 is located between the connection portion of the connection terminal 45 to the corresponding coil terminal 22 and a securing portion of the connection terminal 45 to the coil case 3.

The stress-relaxation portion 451 of the connection terminal 45 works to absorb both a thickness-directional stress applied to the connection terminal 45 in the thickness direction of the connection terminal 45, and a Z-directional stress applied to the connection terminal 45 in the Z direction. For example, the stress-relaxation portion 451 of the connection terminal 45 works to absorb (1) A welding-related stress applied to the connection terminal 45 upon the connection terminal 45 being welded to the corresponding coil terminal 22

(2) A vibration stress applied to the connection terminal 45 due to vibrations of the coil module 1 under usage conditions of the coil module 1

(3) A thermal stress applied to the connection terminal 45 due to vibrations of the coil module 1 under usage conditions of the coil module 1

This therefore enables these stresses applied to the connection terminals 45 to be relaxed.

The coil module 1A of the second embodiment additionally achieves the same benefits as those achieved by the coil module 1.

Modification of Second Embodiment

The following describes a coil module 1B according to a modification of the second embodiment. Between this modification and the second embodiment, similar or equivalent parts, to which like reference characters are assigned, are omitted or simplified to avoid redundant description.

Referring to FIG. 12, the coil module 1B is configured such that no potting member is filled in the coil case 3. Vibrations of the coil module 1B may cause a stress due to the vibrations to be likely to be applied to the connection portion between each connection terminal 45 and the corresponding coil terminal 22.

From this viewpoint, like the second embodiment, the projecting connection terminal 45 of each of the busbars 41, 42, 46, and 47, which is exposed from the coil case 3, of the coil module 1B according to this modification has the stress-relaxation portion 451 located, for example, adjacent to the convexly curved portion 452. The stress-relaxation portion 451 of each connection terminal 45 therefore works to absorb such a stress due to vibrations of the coil module 1B applied to the connection portion between the corresponding connection terminal 45 and the corresponding coil terminal 22.

That is, although the coil module 1B may have a difficulty in reduction of relative displacements between the coil case 3 and the coil device 2, the coil module 1B makes it possible to relax a stress applied, upon such a relative displacement being created, to the connection portion between the corresponding connection terminal 45 and the corresponding coil terminal 22.

Third Embodiment

Figure 13:
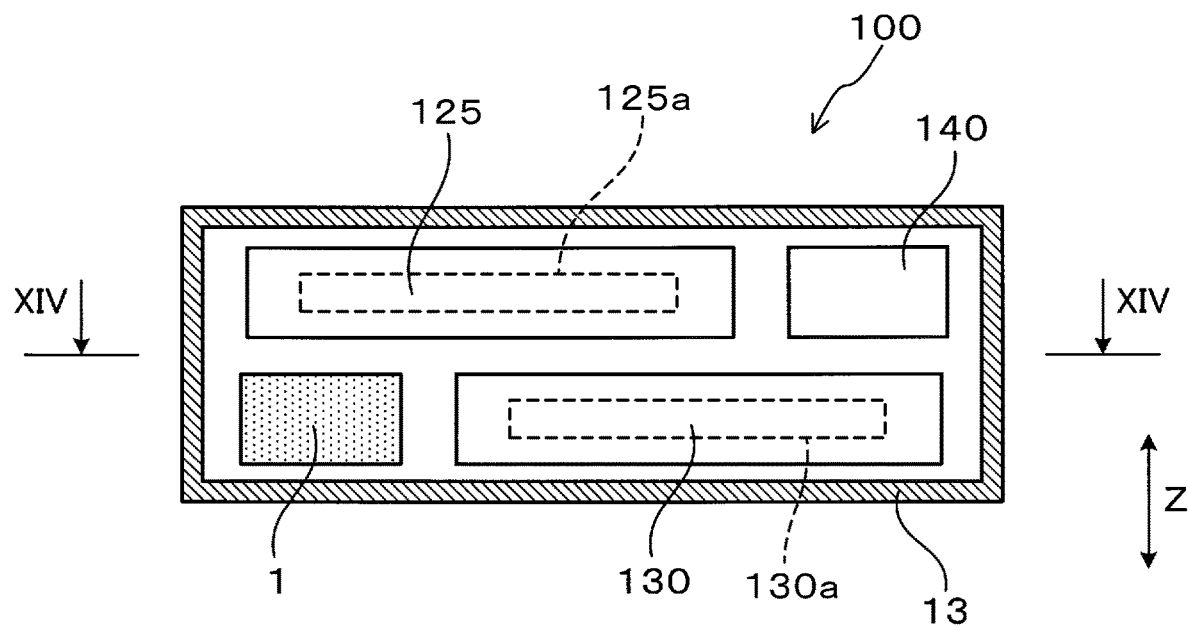
FIG. 13 is a partially cross-sectional plan view of a power converter according to the third embodiment of the present disclosure.
Figure 14:
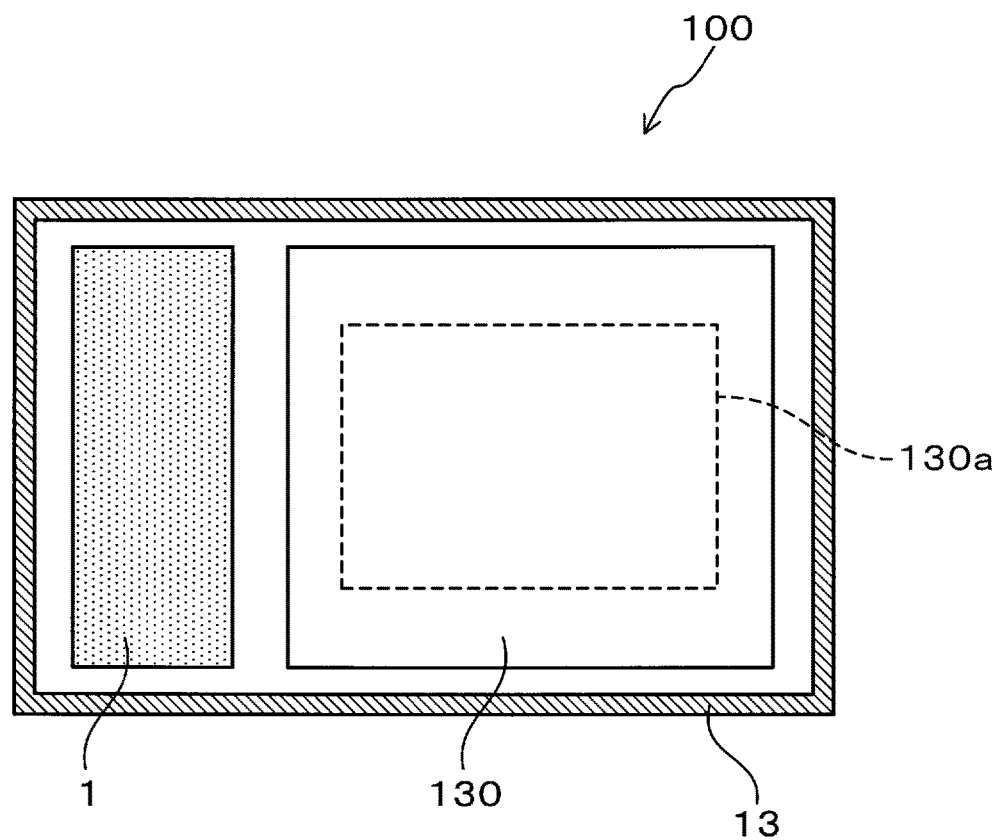
FIG. 14 is a cross-sectional view taken along line XIV-XIV of FIG. 13 as viewed from the direction of arrows XIV-XIV.

The following describes the third embodiment of the present disclosure with reference to FIGS. 13 and 14. The configuration and functions of a power converter 100 according to the third embodiment are mainly different from those of the power converter 10 according to the first embodiment by the following points. The following therefore mainly describes the different points.

Referring to FIGS. 13 and 14, the power converter 100 is configured such that electrical components 125, 130, and 140 are installed in the converter case 13 in addition to the coil module 1.

For example, the power converter 100 according to the third embodiment includes a DC-DC converter as the electrical component 125, a power charger as the electrical component 130, and a relay as the electrical component 140.

The DC-DC converter 125 includes, for example, a circuit board 125a to which a transformer and switches are mounted. The power charger 130 includes, for example, a circuit board 130a to which a DC power source is mounted.

The coil module 1 is connected to at least one of the circuit board 125a of the DC-DC converter 125 and the circuit board 130a of the power charger 130 via the output terminals 44 of the third and fourth busbars 46 and 47.

The DC-DC converter 125 is configured to step up or step down a voltage of DC power inputted thereto from the coil module 1 upon the coil module 1 being connected to the DC-DC converter 125. The stepped-down DC power can be supplied to the power converter circuit 125 of the circuit module 12.

The power charger 130 is configured to rectify AC power inputted thereto into DC power, and store the converted DC power into the DC power source, thus charging the DC power source. The power charger 130 is also configured to store the DC power inputted from the coil module 1, thus charging the DC power source upon the coil module 1 being connected to the power charger 130.

In each of FIGS. 13 and 14, connection lines between the coil module 1 and each of the electrical components 125, 130, and 140 are omitted.

The coil device 2 of the coil module 1 is arranged such that the coil device 2 does not overlay the circuit board 130a of the power charger 130 in the Z direction.

The coil module 1 according to the third embodiment includes the coil device 2, the coil case 3 in which the coil device 2 is installed, and the busbars 4 secured to the coil case 3. This configuration of the coil module 1 enables the coil device 2 to be electrically connected to at least one of the electrical components 125 and 130 via at least one of the busbars 4. This therefore enables the coil device 2 to have a higher degree of flexibility in arrangement in the converter case 13 of the power converter 100. That is, this configuration of the coil module 1 improves a degree of arrangement flexibility of the coil device 2 in the power converter 100 in which the electrical components 125, 130, and 140 are installed.

The coil module 1 of the third embodiment additionally achieves the same benefits as those achieved by the coil module 1.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A coil module comprising:
    a coil device including a coil unit and at least one terminal extending from the coil unit;
    a case configured to house the coil device;
    at least one busbar secured to the case, the at least one terminal being electrically connected to the at least one busbar; and
    a potting member filled in the case to fixedly retain the coil device in the case, wherein:

the coil device includes:
an embedded portion embedded in the potting member; and
an exposed portion exposed from the potting member;
the case comprises:
a first wall;
a second wall opposite to the first wall and having an opening; and
a reference axis defined between the first wall and the second wall;
the potting member filled in the case has a surface in the reference axis, the surface being arranged to face the first and second walls;
the coil unit has a first length in a normal direction to the surface of the potting member; and
the exposed portion of the coil device has a second length in the normal direction to the surface of the potting member, the second length being equal to or more than half the first length of the coil unit.

2. The coil module according to claim 1, wherein:
the at least one terminal extends from the coil unit in a direction of the reference axis to be exposed from the case through the opening of the second wall of the case;
the at least one busbar is partially embedded in the case while at least one predetermined portion of the at least one busbar is exposed from the case;
the at least one predetermined portion of the at least one busbar is exposed from the case to extend in the direction of the reference axis to adjacently face the at least one terminal; and
the at least one predetermined portion of the at least one busbar is joined to the at least one terminal.

3. The coil module according to claim 1, wherein:
the coil unit comprises:
a core; and
at least one winding wound around the core;
the at least one terminal comprises:
first and second terminals extending from the at least one winding in a direction of the reference axis through the opening of the second wall of the case;
the at least one busbar comprises at least first and second busbars, at least a portion of each of the first and second busbars being embedded in the case while at least one predetermined portion of each of the first and second busbars is exposed from the case;
the at least one predetermined portion of each of the first and second busbars is exposed from the case to extend in the direction of the reference axis to adjacently face the corresponding one of the first and second terminals extending from the at least one winding; and
the at least one predetermined portion of each of the first and second busbars is joined to the corresponding one of the first and second terminals extending from the at least one winding.

4. The coil module according to claim 2, wherein:
the at least one predetermined portion of the at least one busbar has a convex portion toward the at least one terminal; and
the convex portion of the at least one predetermined portion of the at least one busbar is joined to the at least one terminal.

5. The coil module according to claim 2, wherein:
the at least one predetermined portion of the at least one busbar has a stress-relaxation portion convexly projecting to be away from the at least one terminal for absorbing a stress upon the stress being applied to the at least one predetermined portion of the at least one busbar.

6. A power converter comprising:
a coil module that is claimed in claim 1;
a circuit board to which at least one switch for power conversion is mounted, the coil module being electrically connected to the circuit board via the at least one busbar.

7. The power converter according to claim 6, wherein:
the coil device of the coil module is arranged not to overlay the circuit board in a normal direction to a major surface of the circuit board.

8. The power converter according to claim 6, wherein:
the power converter comprises a converter case in which the coil module and the circuit board are installed; and
the case of the coil module comprises an attachment portion secured to the converter case of the power converter.

9. A coil module comprising:
a coil device including a coil unit and at least one terminal extending from the coil unit;
a case configured to house the coil device, the case comprising:
a first wall;
a second wall opposite to the first wall and having an opening; and
a reference axis defined between the first wall and the second wall;
at least one busbar secured to the case, the at least one terminal being electrically connected to the at least one busbar; and
a potting member filled in the case to fixedly retain the coil device in the case, wherein:
the coil unit comprises:
a core;
a first winding wound around a first half part of the core; and
a second winding wound around a second half part of the core;
the at least one terminal comprises:
a first pair of terminals extending from the first winding in a direction of the reference axis through the opening of the second wall of the case; and
a second pair of terminals extending from the second winding in the direction of the reference axis through the opening of the second wall of the case;
the at least one busbar comprises first to fourth busbars partially embedded in the case while at least one predetermined portion of each of the first to fourth busbars is exposed from the case;
the at least one predetermined portion of each of the first to fourth busbars is exposed from the case to extend in the direction of the reference axis to adjacently face the corresponding one of the terminals extending from the first and second windings; and
the at least one predetermined portion of each of the first to fourth busbars is joined to the corresponding one of the terminals extending from the first and second windings.

* * * * *